United States Patent
Krzanowski et al.

(10) Patent No.: US 8,625,435 B2
(45) Date of Patent: Jan. 7, 2014

(54) GENERATING AND ALLOCATING PERFORMANCE MONITORING TRAFFIC

(75) Inventors: Roman Krzanowski, White Plains, NY (US); Frank M. Shannon, Arnold, MD (US); William A. Bjorkman, Odenton, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 607 days.

(21) Appl. No.: 12/884,250

(22) Filed: Sep. 17, 2010

(65) Prior Publication Data

US 2012/0069744 A1 Mar. 22, 2012

(51) Int. Cl.
- *G01R 31/08* (2006.01)
- *G06F 11/00* (2006.01)
- *H04L 12/28* (2006.01)
- *H04L 12/56* (2011.01)

(52) U.S. Cl.
USPC .................................... 370/241; 370/395.53

(58) Field of Classification Search
USPC ............................................ 370/241, 395.53
See application file for complete search history.

(56) References Cited

U.S. PATENT DOCUMENTS

| | | | | |
|---|---|---|---|---|
| 7,620,322 | B2* | 11/2009 | Sparks et al. | 398/49 |
| 7,929,448 | B2* | 4/2011 | Kotrla et al. | 370/244 |
| 2004/0022185 | A1* | 2/2004 | Wils et al. | 370/226 |
| 2010/0182914 | A1* | 7/2010 | DelRegno et al. | 370/249 |
| 2010/0254409 | A1* | 10/2010 | Lu et al. | 370/477 |
| 2010/0329147 | A1* | 12/2010 | Nam et al. | 370/254 |
| 2011/0044174 | A1* | 2/2011 | Szymanski | 370/238 |
| 2011/0069622 | A1* | 3/2011 | Gintis et al. | 370/251 |
| 2011/0258346 | A1* | 10/2011 | Said et al. | 709/249 |
| 2012/0033549 | A1* | 2/2012 | Joshi et al. | 370/228 |
| 2013/0028080 | A1* | 1/2013 | Rao et al. | 370/230 |

* cited by examiner

*Primary Examiner* — Farah Faroul (57) ABSTRACT

A method includes monitoring, by a first network device, traffic from a customer device, wherein the traffic is to be forwarded via a provider's network. The method also includes identifying a traffic pattern associated with the traffic, identifying a link on which the identified traffic pattern was transmitted and generating performance monitoring traffic. The method further includes forwarding, by the first network device, the performance monitoring traffic to the provider's network via the link on which the identified traffic pattern was transmitted.

20 Claims, 9 Drawing Sheets

GENERATING AND ALLOCATING PERFORMANCE MONITORING TRAFFIC

BACKGROUND INFORMATION

Link aggregation is a mechanism used to route data between end points using multiple network links and/or ports. For example, a link aggregation group (LAG) may include two or more physical links connecting two end point devices. In a LAG, the physical links are configured to act as a single logical connection between the end point devices. Monitoring LAGs may allow a service provider to ensure that the LAGs are operating properly.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to monitoring traffic and generating performance monitoring traffic. In one exemplary implementation, a network interface device monitors customer traffic and identifies various patterns or flows associated with the customer traffic. The network interface device may generate and forward performance monitoring traffic or test traffic designed to conform to the identified patterns or flows associated with the customer traffic. For example, the network interface device may determine on what link a particular customer traffic flow is forwarded. The network interface device may then forward test traffic on the same link or path. The test traffic may then be used to estimate the behavior of the network with respect to handling a customer's traffic.

Figure 1:
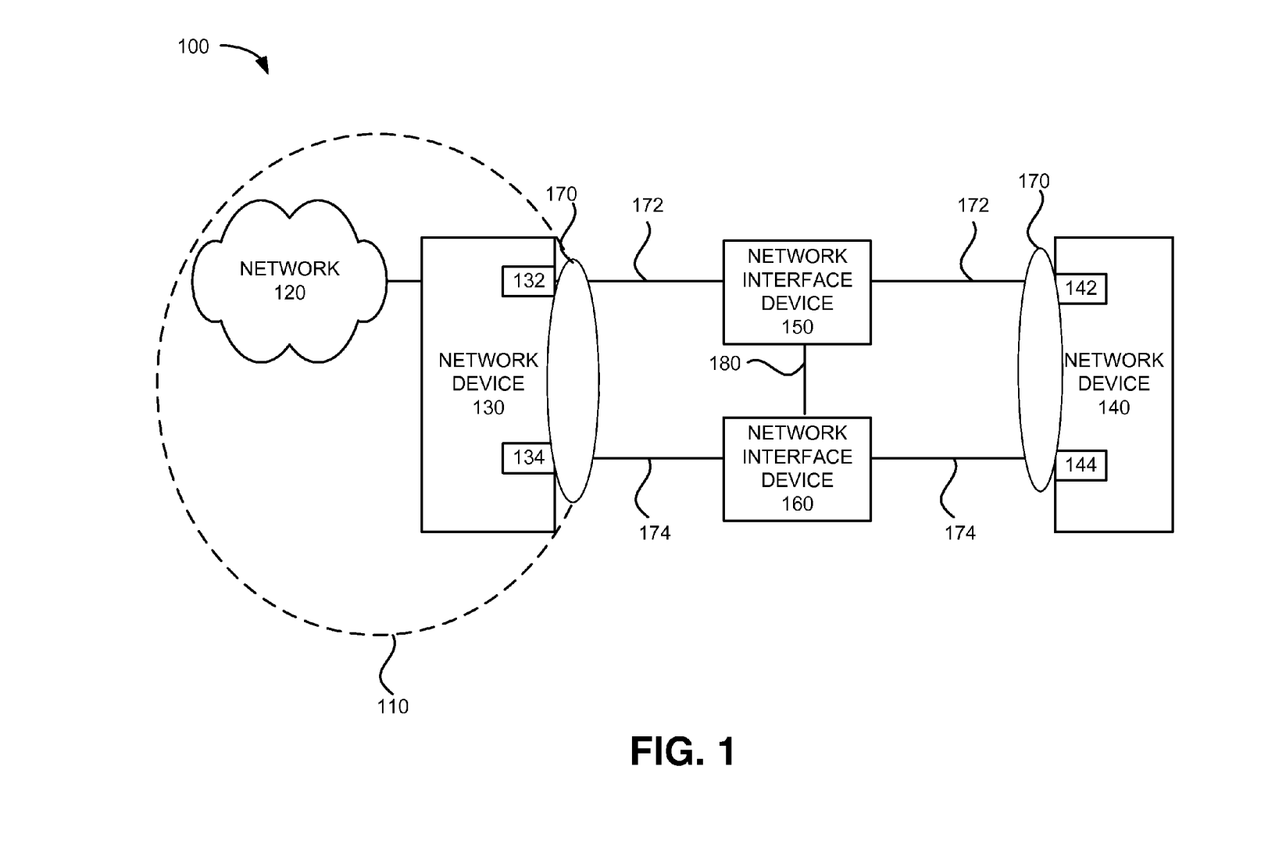
FIG. 1 illustrates an exemplary network in which systems and methods described herein may be implemented.

FIG. 1 is a block diagram of an exemplary network 100 in which systems and methods described herein may be implemented. Network 100 may include network 120, network devices 130 and 140, network interface devices (NIDs) 150 and 160, links 172 and 174 and link 180. In an exemplary implementation, network 120 and network device 130 may be part of spanning tree protocol (STP) domain 110 (illustrated within the dotted line in FIG. 1) that includes network 120. In one implementation, network 120 may include a switched Ethernet system/network (SES). Alternatively, network 120 and domain 110 may represent any network in which data is transmitted from customer sites to other devices in network 100.

In an exemplary implementation, network device 130 may represent a switch, such as a layer 2 switch, that is used to transmit or forward traffic to other devices in network 100. In one implementation, network device 130 may represent an external network to network interface (ENNI). That is, network device 130 may represent the interface between network 120 and external devices/network. Network device 130 may include edge ports 132 and 134 used to forward and receive data from other devices in network 100 via links 172 and 174. Only two edge ports are shown on network device 130 for simplicity. It should be understood that network device 130 may include additional ports (e.g., edge ports) for receiving and transmitting data.

Network device 140 may represent a switch, such as a layer 2 switch, used to transmit or forward traffic to other devices in network 100, such as network device 130. In an exemplary implementation, network device 130 may be coupled to network device 140 via a LAG. For example, referring to FIG. 1, network device 130 may be coupled to network device 140 via LAG 170, which includes links 172 and 174.

Links 172 and 174 may include wired, wireless and/or optical transmission media coupling network devices 130 and 140 in a LAG configuration. A LAG, as discussed briefly above, includes two or more links that are configured to act as a single logical connection between the end point devices. Therefore, in this implementation, LAG 170 includes links 172 and 174 that are configured to act as a single logical connection for routing data between network devices 130 and 140.

NIDs 150 and 160 may each represent an interface device that monitors traffic flowing between various networks/network devices. For example, NIDs 150 and 160 may monitor traffic flow from network device 140 to network device 130. NIDs 150 and 160 may also generate performance monitoring or test traffic for transmission to network device 130 and/or network 120, as described in detail below. The performance monitoring/test traffic may be used to calculate various performance monitoring parameters that may be used for service level agreement (SLA) purposes, quality of service (QoS) purposes, various monitoring and/or testing purposes, etc., as described in detail below.

NIDs 150 and 160 may each be positioned as a "bump-in-the-wire" between network devices 130 and 140. In an exemplary implementation, NIDs 150 and 160 may demarc the boundary between the service provider's administrative domain or network and the customer's administrative domain or network. In such an implementation, NIDs 150 and 160 may be located at the "handoff" from the service provider to the customer. For example, network device 140 may represent a customer's edge device (e.g., a device located at a point where the customer's network interfaces with an external network) and network device 130 may represent a service provider's edge device (e.g., a device located at a point where the service provider's network interfaces with a customer's network).

In one implementation, NIDs 150 and 160 may operate in a "transparent" mode. In the transparent mode, NIDS 150 and 160 do not actively participate in the LAG control plane (LACP) traffic. In such an implementation, NIDs 150 and 160 may pass all LACP frames and may not take action related to the status of LAG 170. NIDs 150 and 160, however, may act as demarcation points between a customer and a service provider and may generate performance monitoring traffic (PMT) for testing and monitoring purposes, as described in more detail below.

Link 180 may include a wired, wireless and/or optical transmission media coupling NIDs 150 and 160. In an exemplary implementation, link 180 may function as a management link and allow NIDs 150 and 160 to exchange control information. For example, NIDs 150 and 160 may exchange information via link 180 to synchronize their states (e.g., active or standby states) with respect to LAG 170 and/or monitoring LAG 170.

The network configuration illustrated in FIG. 1 is provided for simplicity. It should be understood that a typical network 100 may include more or fewer network devices, NIDs and links. For example, LAG 170 may include more than two links. Network 100 may also include additional elements, such as gateways, routers, monitoring systems, etc., that aid in routing traffic and monitoring a LAG.

Figure 2:
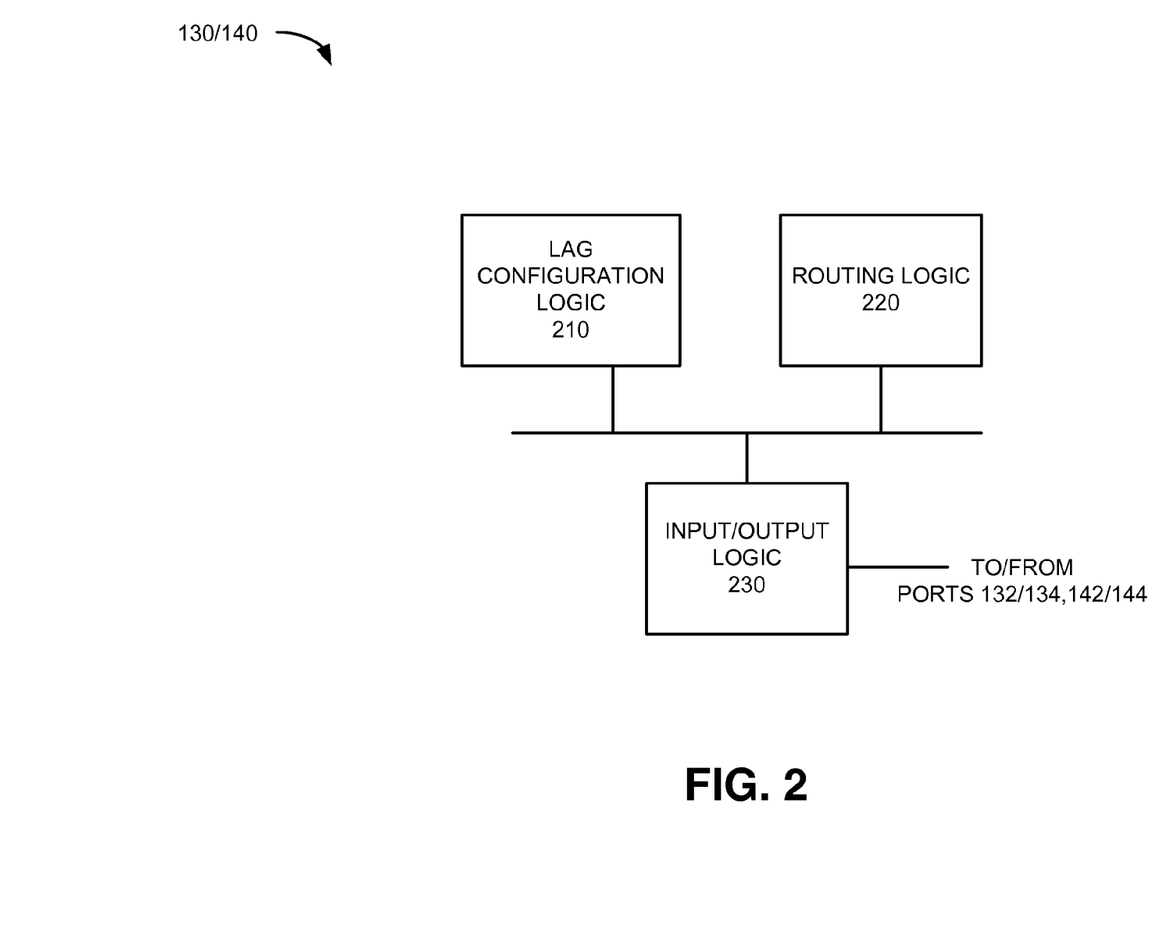
FIG. 2 illustrates an exemplary configuration of logic components implemented in one or more of the network devices of FIG. 1.

FIG. 2 illustrates an exemplary configuration of network device 130. Network device 140 may be configured in a similar manner. Referring to FIG. 2, network device 130 may include LAG configuration logic 210, routing logic 220 and input/output logic 230. The exemplary configuration illustrated in FIG. 2 is provided for simplicity. It should be understood that network devices 130 and 140 may include more or more fewer logic devices than illustrated in FIG. 2.

LAG configuration logic 210 may include logic that is associated with configuring a LAG. For example, LAG configuration logic 210 of network device 130 may include logic for setting up parameters for a LAG, such as LAG 170, between network device 130 and network device 140. As one example, LAG configuration logic 210 may be associated with configuring a speed at which data will be transmitted via the LAG, configuring the number of links in the LAG, configuring which ports will transmit/receive via the LAG links, configuring one network device in the LAG group as a master device and another as a slave device, configuring the LAG for automated set up in which the LAG is automatically configured, configuring the LAG for manual set up requiring an operator to set up the LAG, etc.

Routing logic 220 may include logic for routing data between end point devices. For example, routing logic 220 may identify forwarding information for routing data frames between network devices 130 and 140 via LAG 170.

Input/output logic 230 may include logic for receiving and outputting data frames via network devices 130/140. For example, input/output logic 230 of network device 130 may route data to ports 132 and 134 for transmission to network device 140, and receive data at ports 132 and 134 transmitted from ports 142 and 144 of network device 140.

In an exemplary implementation, LAG configuration logic 210, routing logic 220 and input/output logic 230 may include one or more processors, microprocessors or other processing logic used to interpret and execute instructions. In such implementations, LAG configuration logic 210, routing logic 220 and input/output logic 230 may include software instructions stored in a computer-readable medium. A computer-readable medium may be defined as one or more memory devices. The software instructions may be read into memory from another computer-readable medium or from another device via a communication interface. The software instructions contained in memory may cause the various logic components, such as LAG configuration logic 210, routing logic 220 and input/output logic 230, to perform processes that are described below. Alternatively, hardwired circuitry may be used in place of or in combination with software instructions to implement processes consistent with exemplary embodiments. Thus, systems and methods described herein are not limited to any specific combination of hardware circuitry and software.

Figure 3:
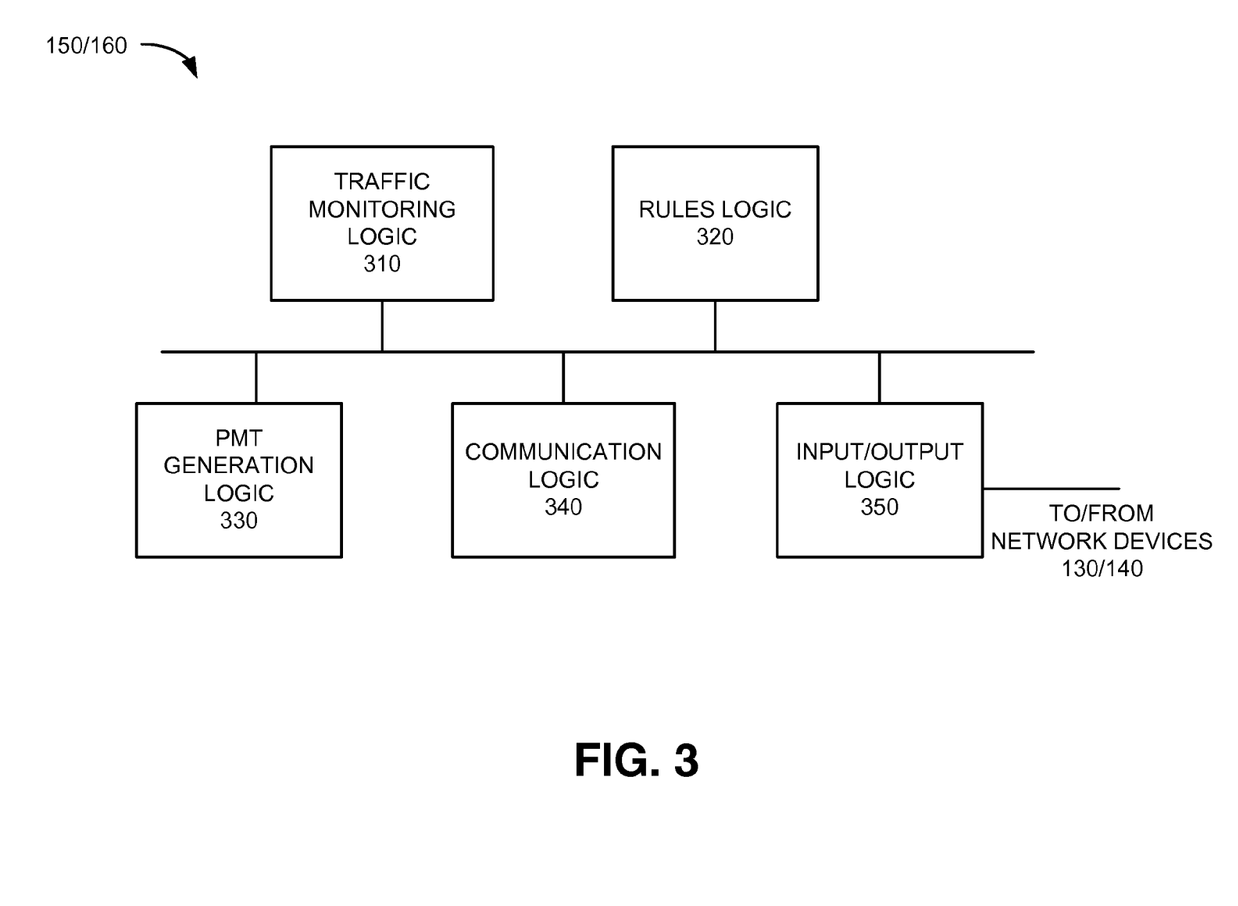
FIG. 3 illustrates an exemplary configuration of logic components implemented in one or more of the network interface devices of FIG. 1.

FIG. 3 illustrates an exemplary configuration of NID 150. NID 160 may be configured in a similar manner. Referring to FIG. 3, NID 150 may include traffic monitoring logic 310, rules logic 320, PMT generation logic 330, communication logic 340 and input/output logic 350. The exemplary configuration illustrated in FIG. 3 is provided for simplicity. It should be understood that NIDs 150 and 160 may include more or more fewer logic devices than illustrated in FIG. 3.

Traffic monitoring logic 310 may include logic that monitors and "learns" traffic flow patterns, such as patterns associated with data flows between user ports and network ports on NID 150, as described in detail below. User ports on NIDs 150/160 may represent ports coupled to network device 140 that receive, for example, customer traffic. Network ports on NIDs 150/160 may represent ports coupled to network device 130 that forward, for example, customer traffic to/from a service provider's network (e.g., network 110 or network 120).

In an exemplary implementation, traffic monitoring logic 310 may also learn whether one or more links in LAG 170 are transmitting data. For example, traffic monitoring logic 310 may determine that one link in LAG 170 is actively transmitting data, while another link is not active or is in a standby state. This may correspond to an active/standby (A/S) LAG mode. In the A/S mode, the standby link may transmit "keep alive" messages, or transmit no traffic at all. Alternatively, traffic monitoring logic 310 may determine that that both links in LAG 170 (e.g., links 172 and 174) are operating in an active mode (e.g., corresponding to an active/active (A/A) LAG mode). PMT generation logic 330 may use the A/S or A/A status of the links to identify a link upon with to transmit PMT, as described below. For example, PMT generation logic 330 may forward PMT traffic on the same link(s) that data traffic is traversing to aid in ensuring the accuracy of the performance measurements.

Traffic monitoring logic 310, as described above, may identify data flows traversing NID 150. In an exemplary implementation, traffic monitoring logic 310 may identify certain combinations of information in various fields of a data flow. These fields may include media access control (MAC) source and destination address (SA, DA) fields, a virtual local area network identifier (VLAN ID) field, a class of service/priority code point (COS/PCP) field, layer 3 information field(s), etc. The information identified in one or more of these fields, such as the DA, SA and/or VLAN ID, may be used by NID 150 to particularly identify data flows and further identify links upon which the data flows are transmitted. PMT generation logic 330 may use this information when forwarding PMT to ensure that the PMT conforms to customer traffic flowing through NIDs 150/160. For example, traffic monitoring logic 310 may monitor an Ethernet virtual connection (EVC) with a VLAN ID of 100. If this EVC having a VLAN ID of 100 is detected on link 172, PMT generation logic 330 may allocate PMT for this EVC to link 172.

Rules logic 320 may store rules associated with allocating PMT to links in a LAG. For example, in one implementation, rules logic 320 may indicate that PMT should be allocated to the active link, if the LAG interface operates in the A/S mode. Another rule stored in rules logic 320 may indicate that PMT for a specific VLAN ID should be forwarded on the same link as the traffic to which the VLAN ID is allocated. Still another rule in rules logic 320 may indicate that PMT for the specific DA/SA signature should be forwarded on the same link as the traffic to which the DA/SA signature is allocated. Rules logic 320 may store additional rules indicating that PMT should be routed on network device 150 in accordance with COS/PCP information. For example, if a traffic flow having a particular priority code included in COS/PCP field indicates that the traffic flow is "high" priority, the traffic flow may be routed via particular queues in various network devices (e.g., NID 150, network device 130, etc.) that are associated with handling high priority traffic. Rules logic 320 may indicate that PMT will be routed via the same queues, buffers, ports, etc., as the traffic flow that the PMT is intended to emulate.

Rules logic 320 may also store decision rules associated with changing flow patterns. For example, traffic monitoring logic 310 may monitor the traffic flow continuously. As the flow pattern changes, traffic monitoring logic 310 may detect changes in the traffic flow. Accordingly, one or more rules stored in rules logic 320 may indicate that the allocation of PMT will change according to changes in the flows identified by traffic monitoring logic 310.

As another example, in some instances, traffic monitoring logic 310 may determine that no traffic flow is being received. In this case, rules logic 320 may indicate that the last learned or prescribed flow pattern should continue to be used by PMT generation logic 330 to generate the PMT until another flow pattern is received and identified. In still other instances, traffic monitoring logic 310 may determine that a specific flow pattern is detected on both links 172 and 174 of LAG 170. In this case, rules logic 320 may indicate that such a flow pattern should be rejected as being non-specific and indicate that PMT generation logic 330 may use arbitrary rules or predetermined rules to generate PMT for transmitting on one of the links. Alternatively, rules logic 320 may indicate that PMT generation logic 310 is to send no PMT to any link(s) in response to detecting a non-specific flow pattern on both links. In some implementations, rules logic 320 may store a rule to prevent too frequent changes with respect to the generation and transmission of PMT. Such a rule may prevent changes in the transmission of PMT based on a "bouncing" of links caused by problems in LAG 170.

In an exemplary implementation, rules stored in rules logic 320 may be provided to NIDs 150/160 by, for example, network personnel associated with monitoring performance of network domain 110 and/or network 120. For example, network personnel may enter the rules into NIDs 150/160 or forward the rules to NIDs 150/160 for storage in rules logic 320. In each case, traffic monitoring logic 310 and rules stored in rules logic 320 may be designed to aid PMT generation logic 330 (in NID 150) in generating and forwarding PMT that conforms to or mirrors observed traffic flows received by NID 150. For example, PMT generation logic 330 may use information identified by traffic monitoring logic 310 to determine on what link a specific traffic flow is present or is being forwarded. PMT generation logic 330 may then use rules in rules logic 320 to allocate PMT to that link. Modeling the PMT to conform to learned traffic flows may result in more accurate estimation of performance parameters associated with a network. For example, as described above, PMT generation logic 330 may access rules stored in rules logic 320 and determine that PMT generated by PMT generation logic 330 is to be forwarded on the same link(s) that real or live customer data traffic is traversing. This helps ensure the accuracy of the performance measurements made with respect to the PMT.

As also described above, traffic monitoring logic 310 may continuously monitor traffic received by NIDs 150 and 160. As the traffic patterns change, PMT generation logic 330 may automatically change the allocation of the PMT among various links, such as links in a LAG, in accordance with the changed traffic patterns to reflect the current or more recently identified traffic flows.

In some implementations, PMT generation logic 330 may also include logic to prevent too frequent changes to the test traffic flows. For example, if LAG 170 is experiencing a problem and traffic is frequently bouncing between links 172 and 174, traffic monitoring logic 310 may identify the changing of the traffic flows between links 172 and 174. PMT generation logic 330 and/or rules logic 320, however, may store a rule indicating that the transmission of PMT should not be changed or switched between links more than once every predetermined period of time. This may avoid unnecessarily changing of the link on which PMT is transmitted based on problems with LAG 170, as opposed to reflecting real traffic flows in network 100.

As described previously, traffic monitoring logic 310 may monitor the patterns of traffic received from user ports and destined for forwarding via network ports on NID 150. In an exemplary implementation, NIDs 150 and 160 may monitor traffic in this direction and PMT generation logic 330 may forward PMT in this same direction.

Communication logic 340 may include logic that allows a NID, such as NID 150, to communicate with other devices, such as NID 160. For example, referring to FIG. 1, NIDs 150 and 160 may be coupled to each other via link 180. Communication logic 340 may allow NIDs 150 and 160 to communicate with each other in a peer-to-peer fashion via link 180. In an exemplary implementation, communication logic 340 may forward LAG synchronization information between NIDs 150 and 160 via link 180. Communication logic 340 may also allow NIDs to forward various information, such as control information to other devices in network 100. For example, in some implementations, communication logic 340 may allow NID 150 to send control messages to network devices 130 and 140.

Input/output logic 350 may include logic for receiving and outputting data via one or more links of LAG 170. For example, input/output logic 350 may route data from user ports on NID 150 to network ports on NID 150. In some implementations, input/output logic 350 may include queues and buffers for temporarily buffering data for output via network ports on NID 150.

In an exemplary implementation, traffic monitoring logic 310, rules logic 320, PMT generation logic 330, communication logic 340 and input/output logic 350 may include one or more processors, microprocessors or other processing logic used to interpret and execute instructions. In such implementations, traffic monitoring logic 310, rules logic 320, PMT generation logic 330, communication logic 340 and input/output logic 350 may include software instructions stored in a computer-readable medium. The software instructions may be read into memory from another computer-readable medium or from another device via a communication interface. The software instructions contained in memory may cause the various logic components, such as traffic monitoring logic 310, rules logic 320, PMT generation logic 330, communication logic 340 and input/output logic 350 to perform processes that are described below. Alternatively, hardwired circuitry may be used in place of or in combination with software instructions to implement processes consistent with exemplary embodiments. Thus, systems and methods described herein are not limited to any specific combination of hardware circuitry and software.

As described above, in certain situations, a service provider may wish to perform performance monitoring associated with providing services to a customer. For example, a service provider associated with NIDs 150 and 160 may perform performance monitoring for a customer associated with network device 140, as described in detail below.

Figure 4:
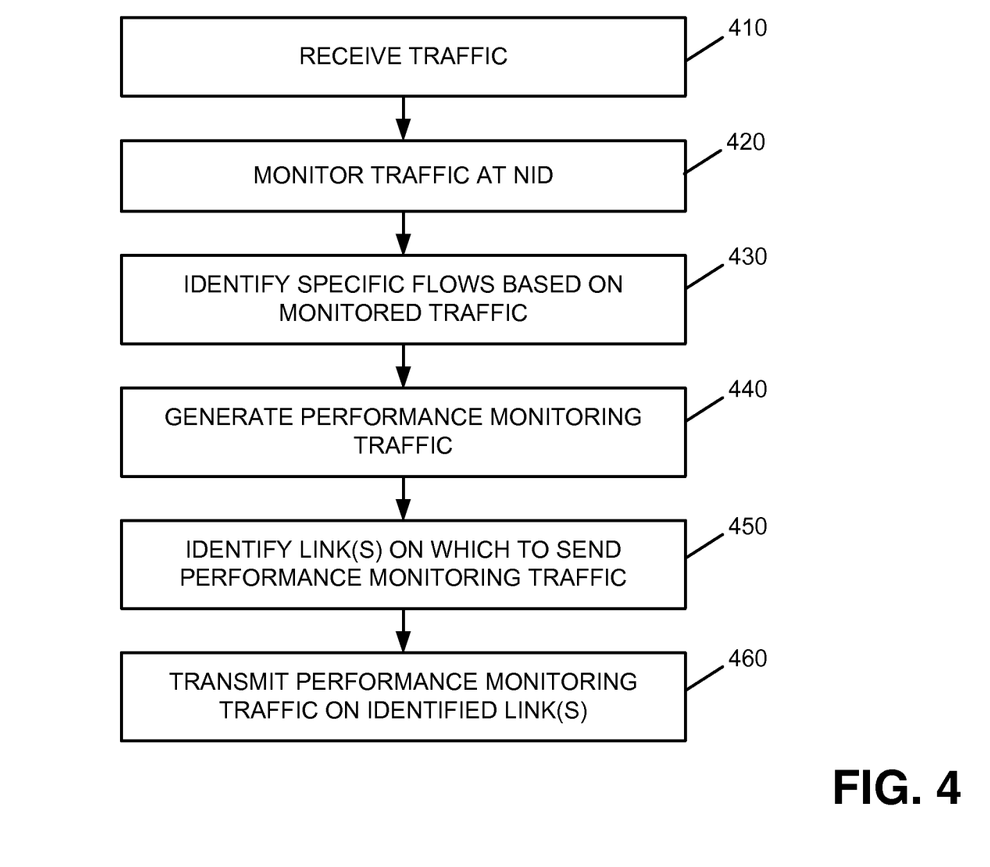
FIG. 4 is a flow diagram illustrating processing associated with the network of FIG. 1 in accordance with an exemplary implementation.

FIG. 4 illustrates exemplary processing associated with monitoring traffic and generating PMT. Processing may begin with NIDs 150 and 160 receiving traffic via LAG 170 (act 410). For example, assume that input/output logic 350 of NID 150 receives traffic on a user port associated with network device 140. Traffic monitoring logic 310 may monitor the traffic (act 420). For example, traffic monitoring logic 310 may monitor the traffic received on a user port, which is destined for a network port on NID 150.

Figure 5:
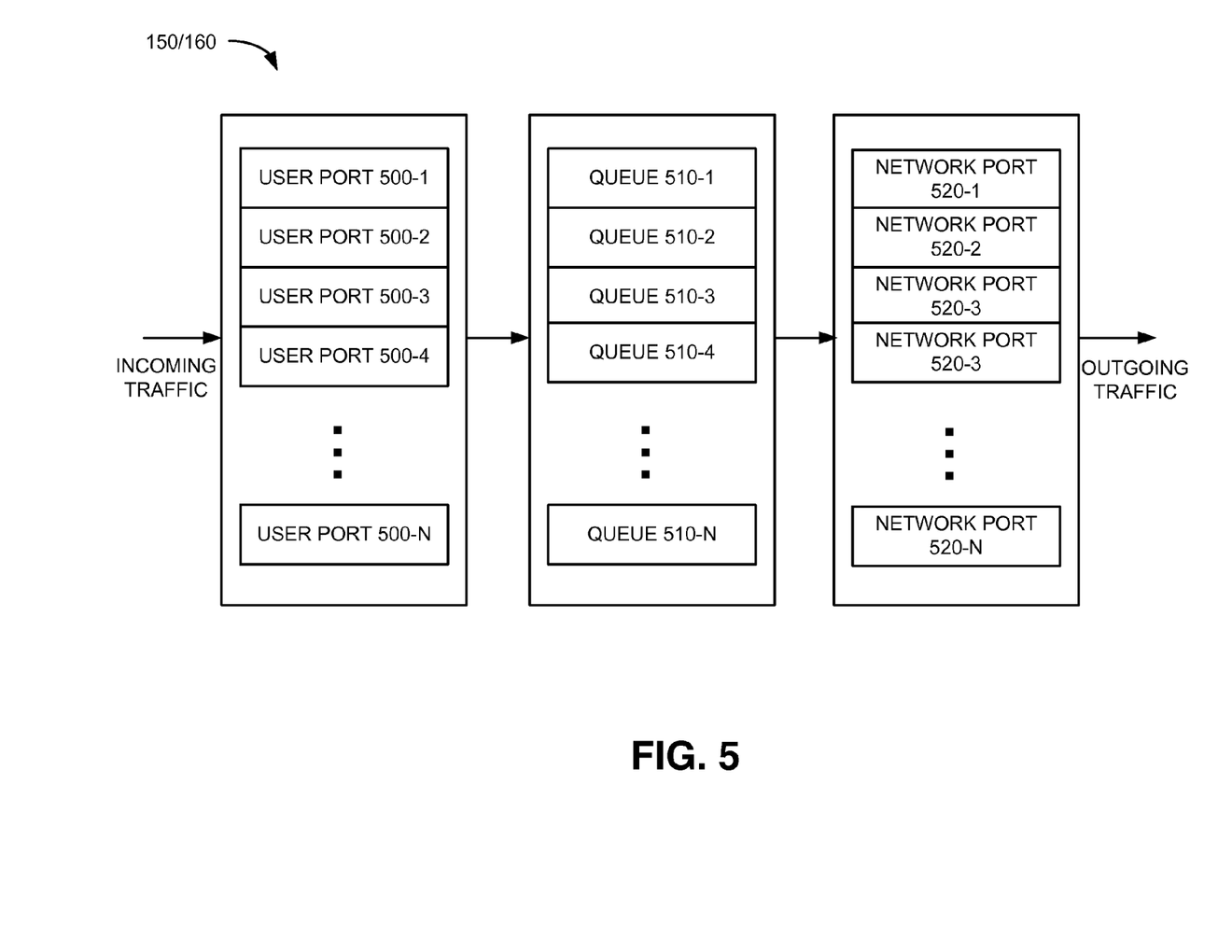
FIG. 5 illustrates a portion of one or more of the network interface devices of FIG. 1 in accordance with an exemplary implementation.

As an example, FIG. 5 illustrates a number of user ports labeled 500-1 through 500-N (referred to collectively as user ports 500), a number of queues labeled 510-1 through 510-N (referred to collectively as queues 510) and a number of network ports 520-1 through 520-N (referred to collectively as network ports 520) located on NID 150. It should be understood that additional devices, such as additional buffers, queues and/or ports, may be included in NID 150. Incoming traffic received by NID 150 may be received on one of user ports 500, queued in one of queues 510 (depending on the traffic load) and forwarded to one of network ports 520 for transmission via one of the links in LAG 170 (e.g., link 172). In an exemplary implementation, queues 510 may be divided into queues associated with various classes of traffic, such as queues that will handle different priorities of traffic. For example, information included in a COS/PCP field of an incoming data frame may indicate that a data flow is associated with "high priority" traffic. PMT generated by PMT generation logic 330 will be forwarded via the same ports, queues and links as the customer traffic to which it is intended to conform or emulate.

Traffic monitoring logic 310 may identify patterns of traffic associated with the received traffic (act 430). For example, as discussed above, traffic monitoring logic 310 may identify or learn a specific flow based on one or more of the DA, SA and/or VLAN ID associated with the received traffic. Traffic monitoring logic 310 may also identify COS bits in a PCP field, or layer 3 information included in flow to identify a particular pattern/flow.

PMT generation logic 330 may use the identified/learned data flows and generate PMT for forwarding on a link in accordance with rules stored in rules logic 320 (act 440). For example, PMT generation logic 330 may generate and forward PMT flows that conform to the learned flows/patterns identified by traffic monitoring logic 310 and in conjunction with rules stored in rules logic 320 associated with identifying a link upon which to forward the PMT. As an example, PMT generation logic 330 may use rules stored in rules logic 320 to identify a link upon which to send the PMT (act 450). For example, if LAG 170 is operating in an A/S mode, PMT generation logic 330 may identify the active link as the link upon which to send the PMT, based on a rule stored in rules logic 320. In other instances, PMT generation logic 330 may forward the PMT on the specific link on which a traffic pattern is detected. In still other instances, PMT generation logic 330 may use arbitrary rules to identify a flow pattern for the PMT if no flow pattern is detected.

In each case, PMT generation logic 330 may generate PMT that is intended to conform to real incoming traffic flows, including identifying one or more links on which to forward the PMT in accordance with rules stored in rules logic 320.

PMT generation logic 330 may then forward the PMT to input/output logic 350 for forwarding via the identified link (s) (act 460).

As an example, PMT generation logic 330 may forward a certain number of packets every predetermined period of time on a particular link to conform to an identified data flow associated with that particular link. For example, PMT generation logic 330 may send 200 packets (i.e., PMT packets) via input/output logic 350 every three seconds for a ten minute interval on link 172. As another example, PMT generation logic 330 may forward one packet every predetermined duration (e.g., every one second, every 100 milliseconds, etc.) continuously on a particular link, or until an identified flow pattern changes.

Figure 6:
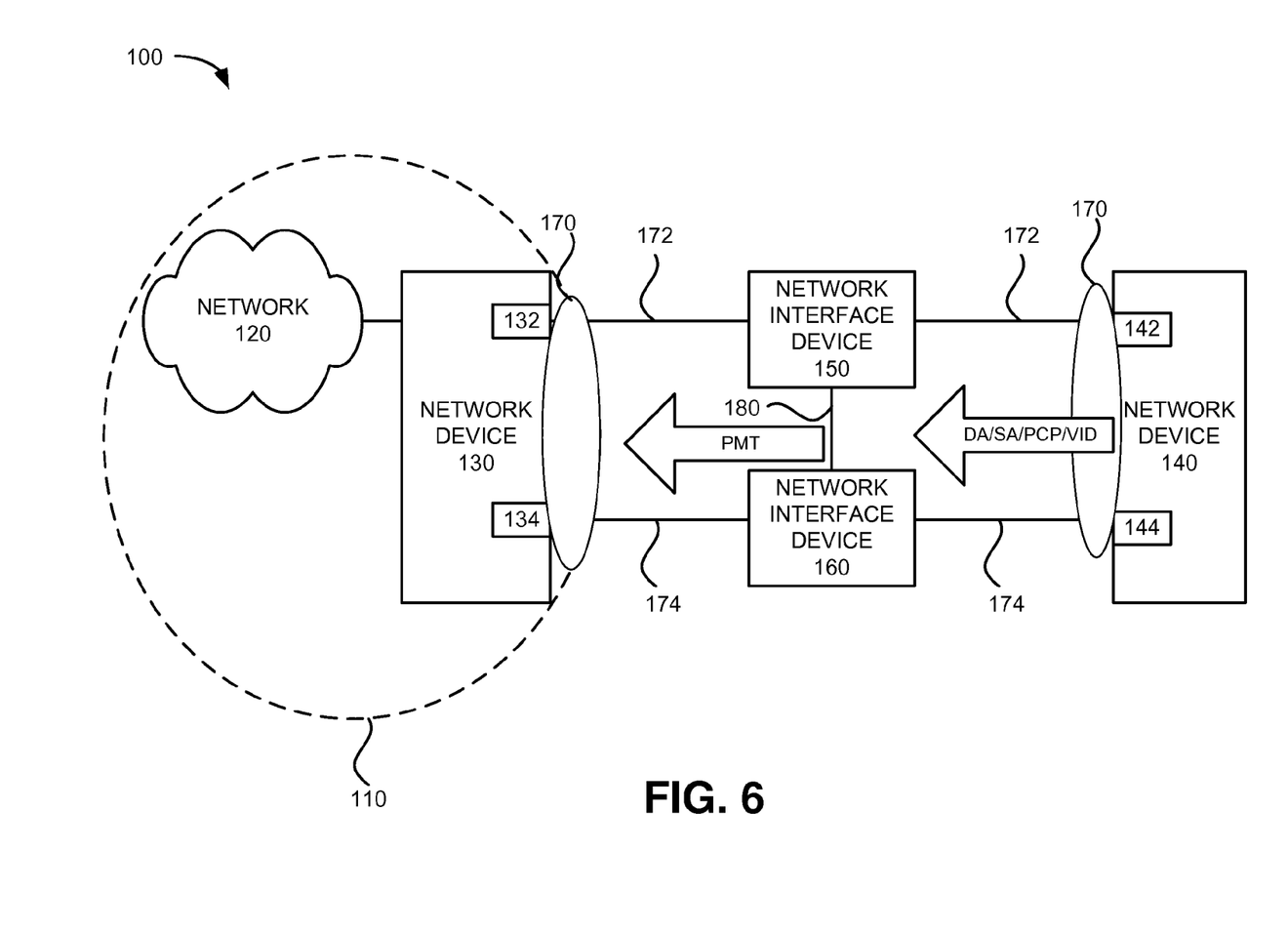
FIG. 6 illustrates the direction of performance monitoring traffic flow in accordance with the flow diagram of FIG. 5.

FIG. 6 illustrates the direction of data flow and PMT flow in network 100. As illustrated, a traffic flow having a particular DA/SA/PCP/VLAN ID may be forwarded from network device 140 toward NIDs 150/160. NID 150 and/or 160 may forward PMT via network ports and/or links on NIDs 150/160 toward network device 130 to conform to identified traffic patterns.

Figure 7:
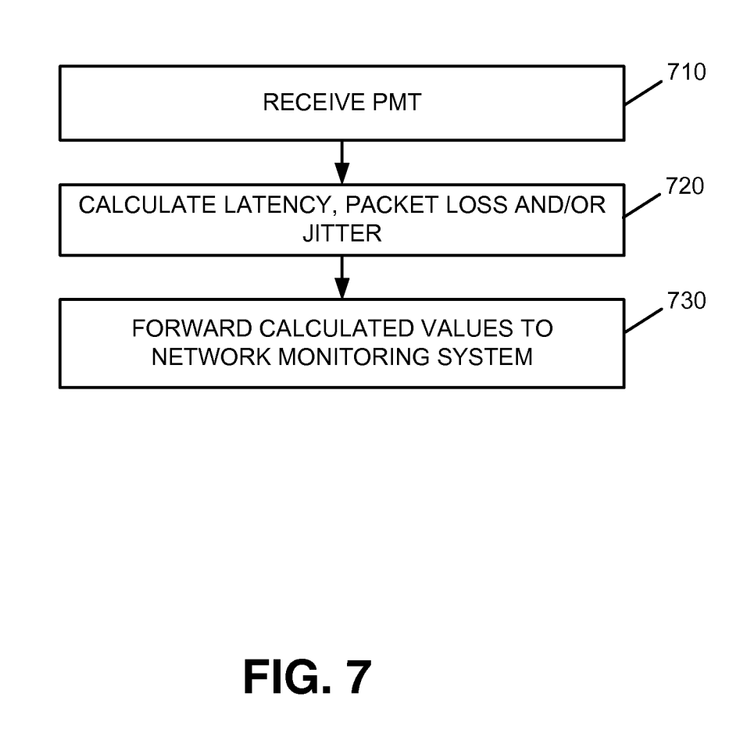
FIG. 7 is a flow diagram illustrating processing associated with processing performance monitoring traffic in accordance with an exemplary implementation.

After PMT is forwarded, the PMT may be used to estimate various parameters associated with LAG 170, network 120 and/or domain 110. For example, FIG. 7 illustrates exemplary processing associated with the transmitted PMT. Processing may begin with network personnel and/or devices in network 100 identifying parameters that are to be monitored with respect to the transmitted PMT. As an example, assume that network personnel associated with monitoring network 120 may wish to monitor latency, packet loss and jitter.

Figure 8:
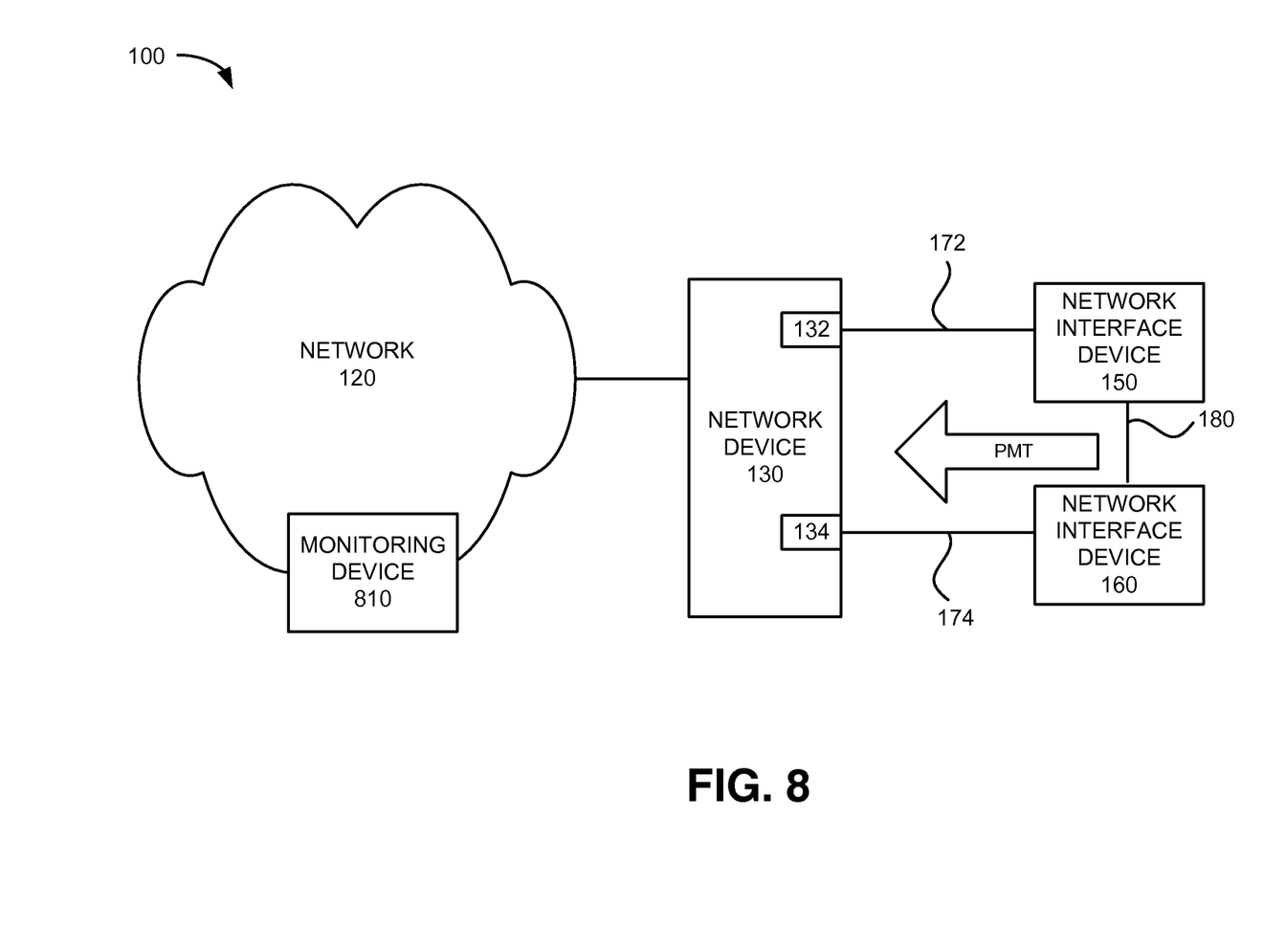
FIG. 8 illustrates a portion of the network of FIG. 1 in accordance with the flow diagram of FIG. 7.

A monitoring device in network 100 may receive the transmitted PMT (act 710). For example, a monitoring device located at an edge portion or a destination portion of network 100 may be configured to receive PMT. As an example, FIG. 8 illustrates an exemplary portion of network 100 associated with monitoring PMT. Referring to FIG. 8, network 120 includes monitoring device 810. Monitoring device 810 may include one or more processors, microprocessors or other processing logic associated with calculating various parameters associated with PMT. In some implementations, monitoring device 810 may be located at a portion of network 120 so that monitoring device 820 may receive or intercept the PMT. In other instances, some PMT may be addressed to monitoring device 810.

Continuing with the example above, monitoring device 810 may receive the PMT and calculate latency, packet loss and jitter values based on the received PMT (act 720). For example, the PMT may include time tag information indicating when it was transmitted from NID 150. In this case, based on the time that the PMT was received, monitoring device 810 may determine latency associated with forwarding the PMT. Monitoring device 810 may also determine packet loss by, for example, comparing information in the received PMT with information indicating the number of packets included in the transmitted PMT. Monitoring logic 810 may also determine a jitter value by comparing variations in latency associated with received packets. In each case, monitoring device 810 may calculate the desired parameters associated with the PMT.

In an exemplary implementation, monitoring device 810 may forward the calculated values to a network monitoring system (act 730). The network monitoring system may then determine whether network 120 and/or domain 110 are meeting various requirements (e.g., SLA requirements, QoS requirements, etc.) associated with routing customer data via network 120/domain 110.

Figure 9:
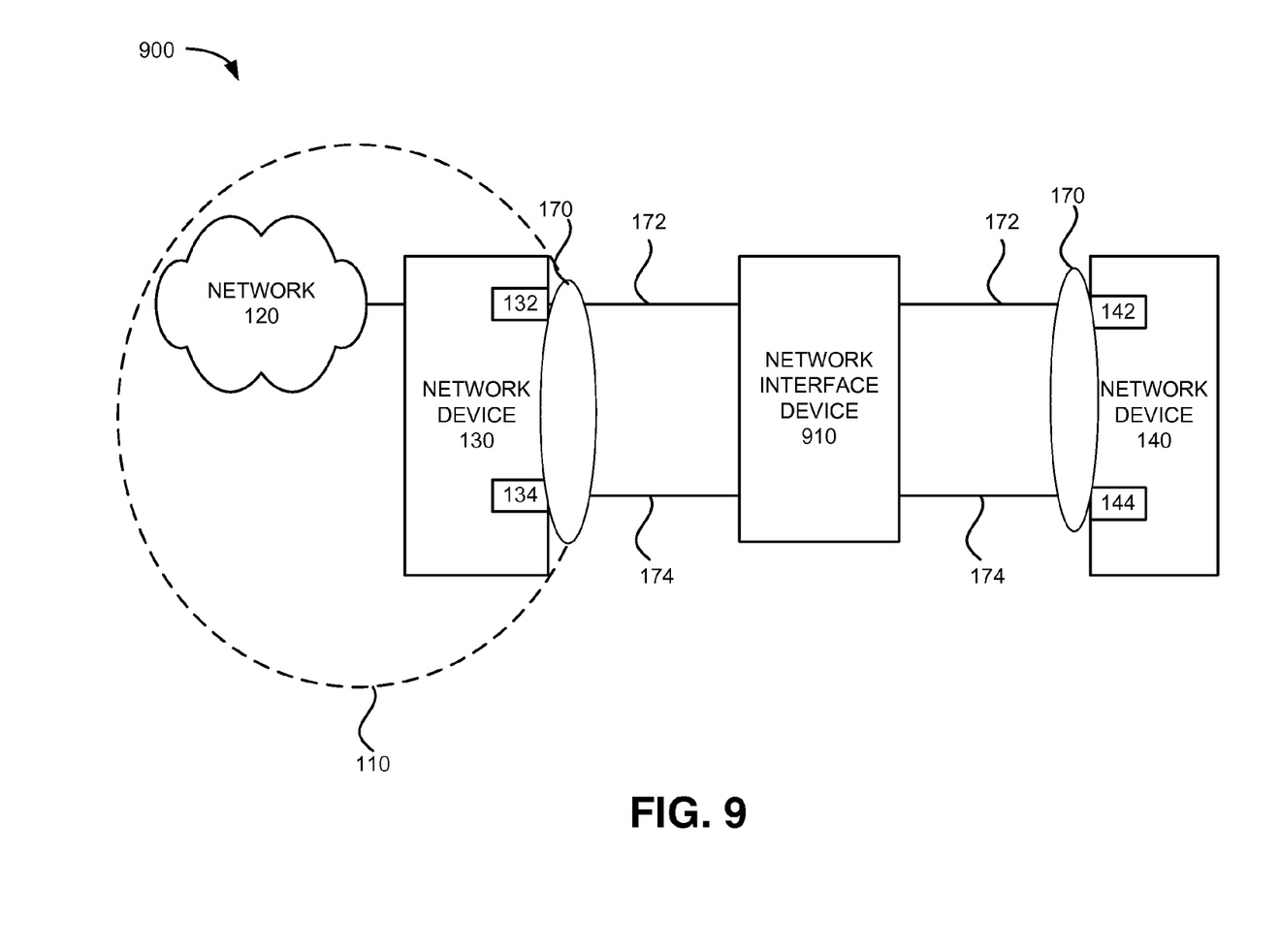
FIG. 9 illustrates another exemplary network in which systems and methods described herein may be implemented.

As described above, NIDs 150 and 160 may monitor traffic and generate PMT for transmission via a service provider's network. In accordance with another exemplary implementation, a single NID may be used. For example, FIG. 9 illustrates an exemplary network 900 that includes NID 910, as opposed to NIDs 150 and 160 illustrated in FIG. 1. In network 900, NID 910 may act as a demarcation point between a customer's network and a service provider's network (similar to NIDs 150 and 160). In network 900, NID 910 may include similar logic components as NIDs 150/160 illustrated in FIG. 3 and described above. In this implementation, NID 910 may continuously monitor traffic and generate PMT as described above with respect to NIDs 150 and 160.

In some implementations, performance monitoring may be performed without the use of NIDs 150/160 or 910. For example, performance monitoring may be performed at the link level. In this scenario, network device 130 may monitor traffic received on links 132 and 134. Network device 130 may also include rules and/or logic similar to that described above with respect to FIG. 3. Network device 130 may then monitor the received traffic and determine that PMT should run over link 132 for a given service.

As an example, network device 140 may be sending all traffic over link 132 for VLAN ID 10. Network device 130 may monitor traffic received via links 132 and 134 and generate PMT for forwarding via link 132 to conform to the traffic associated with VLAN ID 10. Network device 130 may forward the PMT to network device 140 (e.g., a maintenance point on network device 140) via link 132. In some implementations, network device 140 may reflect back the PMT to network device 130 via link 132. In this manner, PMT may be generated and forwarded by devices other than NIDs.

Implementations described herein provide for monitoring traffic on a network and generating and forwarding PMT or test traffic to conform to learned traffic flow patterns associated with the monitored traffic. In an exemplary implementation, a network interface device may determine on what link a particular customer traffic flow has been forwarded and forward PMT on the same link or path to conform to the customer traffic flow. In this manner, the PMT may then be routed in a similar manner as the customer's traffic. This may allow more accurate monitoring of the operation of the network.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, NIDs 150, 160 and/or NID 910 were described as monitoring data received via a LAG/LAG interface. In some implementations, NIDs 150, 160 and/or 910 may monitor any location in a network, such as any demarcation point between a customer network and a service provider's network and generate PMT as described above. That is, in some implementations, NIDs 150, 160 and/or 190 may be used to generate PMT for any type of network connection, and not just those involving LAGs.

In addition, implementations have been described above with respect to identifying traffic patterns based on particular fields identified in received traffic flows. In other implementations, traffic flows may be identified based on other information/fields included in received traffic flows.

Further, implementations have been described above with respect to a LAG that is illustrated as including two links. It should be understood that in other implementations, a LAG may include more than two links that connect end point devices (e.g., network devices 130 and 140). In addition, each network interface device in network 100 (e.g., NIDs 150/160) may include a large number of network ports or paths upon which traffic may be forwarded. In each case, PMT generation logic 330 may forward PMT on a link or path that conforms with learned traffic patterns associated with traffic flowing through the particular NID.

Still further, while series of acts have been described with respect to FIGS. 4 and 7, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
monitoring, by a first network device, traffic from a customer device, wherein the traffic is to be forwarded via a provider's network, wherein the first network device is coupled to the provider's network via at least a first link and a second link;
identifying, by the first network device, a traffic pattern associated with the traffic;
detecting, by the first network device, that the identified traffic pattern was transmitted on the first link;
generating, by the first network device, first performance monitoring traffic;
forwarding, by the first network device, the first performance monitoring traffic to the provider's network via the first link;
identifying a second traffic pattern associated with traffic from the customer device;
detecting that the second traffic pattern was transmitted on the second link;
generating second performance monitoring traffic; and
forwarding the second performance monitoring traffic to the provider's network via the second link.

2. The method of claim 1, wherein the identifying a traffic pattern comprises:

identifying at least one of a source address, destination address, virtual local area network identifier (VLAN ID) or class of service associated with the traffic.

3. The method of claim 2,
wherein the forwarding the first performance monitoring traffic comprises:
forwarding the first performance monitoring traffic on the first link in response to detecting that the traffic was transmitted on the first link.

4. The method of claim 1, further comprising:
identifying, by the first network device, an active link in a link aggregation group; and
forwarding, by the first network device, performance monitoring traffic via the active link.

5. The method of claim 1, further comprising:
changing, by the first network device, a link upon which performance monitoring traffic is transmitted in response to changing traffic patterns identified by the first network device.

6. The method of claim 1, further comprising:
determining, by the first network device, that no traffic is being received; and
forwarding, by the first network device, the first performance monitoring traffic based on a previously identified data flow.

7. The method of claim 1, further comprising:
determining at least one of latency, packet loss or jitter based on the first performance monitoring traffic.

8. The method of claim 1, wherein the generating first performance monitoring traffic comprises:
generating test traffic to conform to customer traffic received by the first network device.

9. A method, comprising:
monitoring, by at least one interface device coupled to at least one link in a link aggregation group (LAG), traffic received via the LAG;
identifying, by the at least one interface device, a plurality of data flows associated with the traffic;
identifying, by the at least one interface device, a first link in the LAG on which a first one of the plurality of data flows was transmitted;
identifying, by the at least one interface device, a second link in the LAG on which a second one of the plurality of data flows was transmitted;
generating, by the at least one interface device, performance monitoring traffic based on the identified first and second data flows;
forwarding, by the at least one interface device, the performance monitoring traffic on the first link in response to the identified first data flow; and
forwarding, by the at least one interface device, the performance monitoring traffic on the second link in response to the identified second data flow.

10. The method of claim 9, wherein the identifying the plurality of data flows comprises:
identifying a data flow based on at least one of a source address, destination address, virtual local area network identifier (VLAN ID) or class of service associated with traffic received via the LAG.

11. The method of claim 10, further comprising:
forwarding, via links in the LAG, a plurality of performance monitoring traffic patterns, each of the plurality of performance monitoring traffic patterns corresponding to one of the plurality of identified data flows.

12. The method of claim 11, wherein the forwarding a plurality of performance monitoring traffic patterns further comprises:
forwarding the plurality of performance monitoring traffic patterns via links in the LAG on which the corresponding data flows were transmitted.

13. The method of claim 9, further comprising:
identifying, by the at least one interface device, an active link in the LAG; and
forwarding, by the at least one interface device, performance monitoring traffic via the active link.

14. The method of claim 9, wherein the at least one interface device comprises a plurality of interface devices, and wherein the monitoring comprises:
monitoring, by a first one of the plurality of interface devices, the first link in the LAG, and
monitoring, by a second one of the plurality of interface devices, the second link in the LAG.

15. A device, comprising:
a plurality of ports configured to transmit and receive data over a plurality of transmission links, the plurality of transmission links comprising a link aggregation group (LAG); and
logic configured to:
monitor data received via the LAG,
identify data flow patterns associated with the received data, wherein each of the data flow patterns has a corresponding receive port and a corresponding transmit port;
generate test traffic, and
forward, via one of the plurality of transmit ports, the test traffic based on the identified data flow patterns,
wherein when forwarding the test traffic, the logic is configured to:
identify, for each of the identified data flow patterns, a link in the LAG on which the identified data flow pattern was received, and
transmit, for each of the identified data flow patterns, the test traffic on the identified link.

16. The device of claim 15, wherein when identifying data flow patterns, the logic is configured to:
identify a data flow based on at least one of a source address, destination address, virtual local area network identifier (VLAN ID) or class of service associated with data received via the LAG.

17. The device of claim 15, wherein when generating test traffic, the logic is configured to:
generate a plurality of test traffic flows, and when forwarding the test traffic, the logic is configured to:
forward the plurality of test traffic flows on links corresponding to links on which the plurality of identified data flow patterns were received.

18. The device of claim 15, wherein the logic is further configured to:
identify an active link in the LAG, and
forward the test traffic via the active link.

19. The device of claim 18, wherein the logic is further configured to:
identify changes in an active or standby status of links in the LAG, and
forward the test traffic on a link in the LAG based on the identified changes.

20. The device of claim 15, wherein the logic is further configured to:
change a link upon which the test traffic is forwarded based on changes in the identified data flow patterns.

* * * * *